United States Patent
Ewers et al.

(10) Patent No.: US 8,534,218 B2
(45) Date of Patent: Sep. 17, 2013

(54) POINTER DISPLAY

(75) Inventors: Paul Simon Ewers, South Woodham Ferres (GB); Jens Hakon Brandal, Chelmsford (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 744 days.

(21) Appl. No.: 12/762,704

(22) Filed: Apr. 19, 2010

(65) Prior Publication Data

US 2010/0289637 A1 Nov. 18, 2010

(30) Foreign Application Priority Data

May 13, 2009 (GB) .................................... 0908180.3

(51) Int. Cl.
*G01D 7/02* (2006.01)
*G01D 13/00* (2006.01)
*G08B 5/24* (2006.01)

(52) U.S. Cl.
USPC ............................ 116/301; 116/300; 116/62.4

(58) Field of Classification Search
USPC ................. 116/284, 286, 287, 288, 293, 300, 116/301, 302, 62.1, 62.4; 340/461, 462, 340/488
See application file for complete search history.

(56) References Cited

U.S. PATENT DOCUMENTS

| 2,112,704 A | * | 3/1938 | Mackay | 116/291 |
|---|---|---|---|---|
| 2,169,048 A | * | 8/1939 | Howe et al. | 73/198 |
| 2,290,278 A | * | 7/1942 | Failla | 368/234 |
| 2,638,866 A | * | 5/1953 | Sage | 116/294 |
| 2,976,674 A | * | 3/1961 | Haydon | 368/228 |
| 3,997,777 A | * | 12/1976 | Pucciarello | 362/23 |
| 4,170,132 A | | 10/1979 | Serley | |
| 4,194,587 A | * | 3/1980 | Shino et al. | 180/90 |
| 4,324,197 A | * | 4/1982 | Parfitt | 116/300 |
| 4,380,043 A | | 4/1983 | Takamatsu et al. | |
| 6,178,917 B1 | * | 1/2001 | Jansa | 116/286 |
| 6,408,784 B1 | | 6/2002 | Ross | |
| 6,854,416 B2 | * | 2/2005 | Breinich et al. | 116/202 |
| 6,915,758 B2 | * | 7/2005 | Nakagawa et al. | 116/286 |
| 7,066,630 B1 | | 6/2006 | Venkatram | |
| 7,404,374 B2 | * | 7/2008 | Kato | 116/286 |
| 7,506,607 B2 | * | 3/2009 | Takato | 116/301 |
| 2006/0236915 A1 | * | 10/2006 | Baba | 116/286 |

FOREIGN PATENT DOCUMENTS

| DE | 29 607 905 | | 7/1996 |
|---|---|---|---|
| DE | 19828041 A1 | | 1/2000 |
| DE | 10302386 A1 | | 8/2004 |
| DE | 102007004586 A1 | | 8/2008 |
| JP | 56027611 A | * | 3/1981 |

(Continued)

*Primary Examiner* — R. A. Smith
(74) *Attorney, Agent, or Firm* — Fraser Clemens Martin & Miller LLC; J. Douglas Miller

(57) ABSTRACT

A pointer display includes at least two pointer assemblies, each assembly having a hub and a pointer arm, each pointer arm extending outwards from a corresponding hub, the hubs being rotatable about a common axis and positioned apart from each other along an axial direction such that a first one of the hubs of a first pointer assembly is closest to a viewer of the dial display. The display also includes a cap for covering the first hub; and supporting means for supporting the cap, the supporting means including a supporting member that extends through a passage in the first hub so that the cap is supported independently of the first hub.

20 Claims, 6 Drawing Sheets

(56) References Cited

FOREIGN PATENT DOCUMENTS

| JP | 59151063 | A | * | 8/1984 |
| JP | 2000/074701 | | | 3/2000 |
| JP | 2008/304296 | | | 12/2008 |
| JP | 2009288143 | A | * | 12/2009 |

* cited by examiner

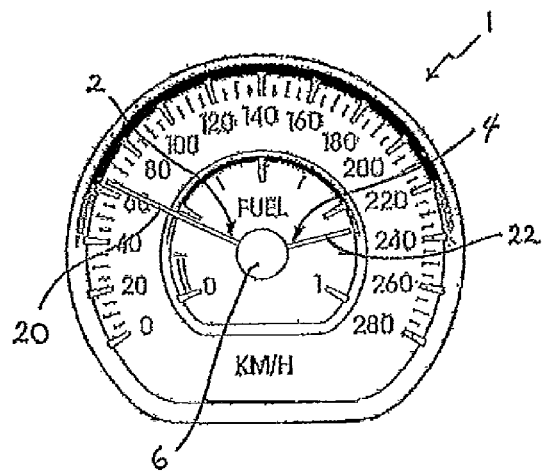
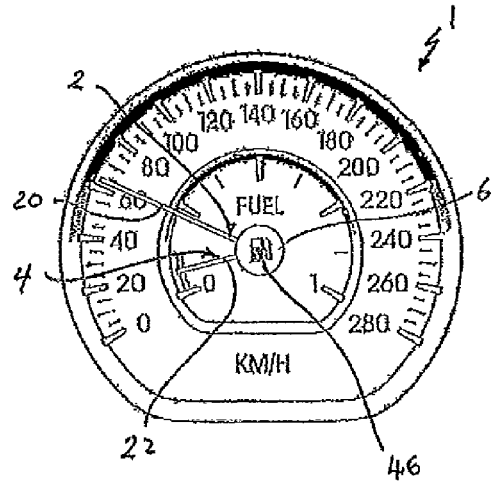
Fig. 6A  Fig. 6B
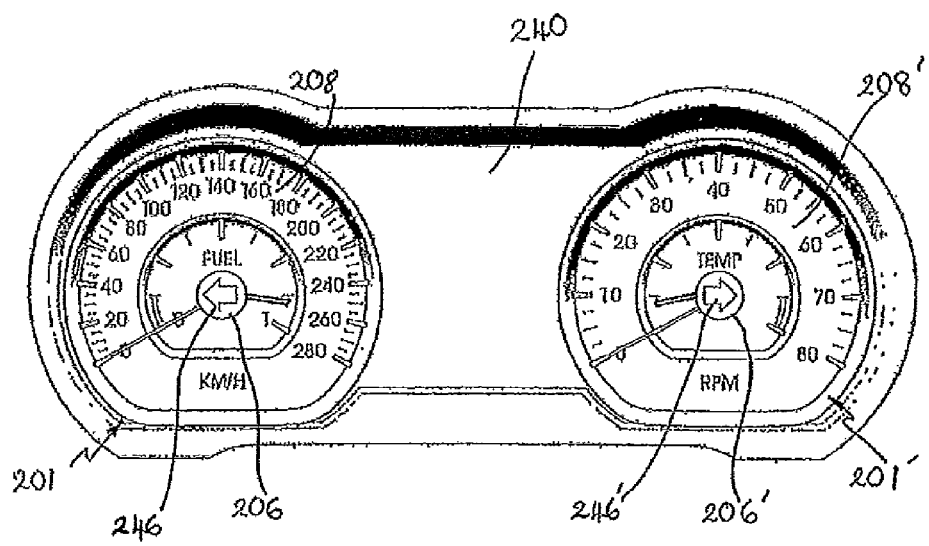
Fig. 7

POINTER DISPLAY

CROSS-REFERENCE TO RELATED APPLICATION

This application claims priority to United Kingdom Patent Application No. 0908180.3 filed May 13, 2009, the entire disclosure of which is hereby incorporated herein by reference.

FIELD OF THE INVENTION

This invention relates to displays having at least two pointers, and more specifically to a display in a motor vehicle having at least two pointers.

BACKGROUND OF THE INVENTION

In motor vehicles, a large amount of information is conveyed to the driver using displays, each having a dial and a pointer. In general, each type of information, for example speed, engine speed (rpm), and fuel level, is displayed on a separate dial. This way of displaying the information means that usually the display unit containing the dials is cluttered and the dials have to be made smaller in order to show all of the required information. Furthermore, the layout of the dials may mean that some of the information is not clearly visible to the driver at all times.

In addition to the information displayed on dials, there may also be further displays for indicating vehicle conditions, for example a fuel level warning indicator or an oil temperature warning light. All of these also require space in the display unit and must be clearly visible to the driver.

In addition, there is often a requirement to provide the customer with a quality feel. This quality feel is sometimes achieved by mounting or moving mechanical components in a manner which does not appear to be possible to the viewer.

It is an object of the present invention to provide an improved pointer display, which deals with these limitations.

SUMMARY OF THE INVENTION

According to a first aspect of the invention there is provided a pointer display comprising at least two pointer assemblies, each assembly having a hub and a pointer arm, each pointer arm extending outwards from a corresponding hub, the hubs being rotatable about a common axis and being positioned apart from each other along an axial direction such that a first one of the hubs of a first pointer assembly is closest to a viewer of the dial display; a cap for covering or partially covering the first hub; and supporting means for supporting the cap, the supporting means including a supporting member that extends through a passage in the first hub so that the cap is supported independently of the first hub.

In another embodiment, the supporting means is not coaxial with the hubs so that the first hub may rotate freely with respect to the supporting member, the passage is a slot extending in a circumferential direction through the first hub. Alternatively, the passage may be a passage that extends along the rotational axis of the pointer assemblies.

Generally, the pointer display will be such that the rotational speed of the first pointer assembly is greater than the rotational speed of the other pointer assemblies. In this way, with the cap not connected to the first hub, the cap appears to remain stationary with respect to the rotation of the first pointer assembly.

Typically, the two pointer assemblies will be used with a dial, which forms a further part of the pointer display. In this arrangement, the supporting means may be attached to a dial face or to mounting means behind the dial. These mounting means may comprise the motors or gearing used to control the rotation of the pointer assemblies.

In another embodiment, the supporting means is attached to or includes a second hub of a second pointer assembly, so that the cap rotates in unison with the second hub. Typically, the second hub is directly adjacent the first hub. As previously mentioned, the second hub will typically indicate a more slowly changing value than the first hub, and therefore, the cap will appear to remain substantially stationary with respect to the first hub.

Typically, the pointer display will comprise two pointer assemblies, a first assembly having a longer pointer arm relative to a second assembly. The pointer assemblies may be used with a dial, the dial comprising two concentric scales indicating different measured values, such that the pointer arm of the first assembly indicates a value on an outer scale and the pointer arm of the second assembly indicates a value on an inner scale. The values may be chosen such that the average rotational speed of the first pointer assembly is greater than the average rotational speed of the second pointer assembly.

In order to display additional information, the cap of the pointer display may include display means. Generally, the display means includes a graphic such as a symbol, however, the display means may be a light.

If the cap is connected to a second hub by the supporting means, it may be preferable for the display means to include compensation means to compensate for the orientation of the graphic with respect to the orientation of the second hub, so that the graphic remains in a fixed orientation with respect to a viewer of the pointer display.

In some embodiments, it may be advantageous if the display means is such that the graphic is visible to a viewer of the pointer display only over a limited range of orientations of the second hub, for example when the measured quantity reaches a critical value. To achieve this effect, the display means may include micro louvers.

In further embodiments, the display means may be an OLED display or a holographic display.

Also according to a second aspect of the invention, there is provided a motor vehicle comprising a display unit for displaying vehicular operating conditions to an operator of the vehicle, the display unit including a pointer display, and the pointer display being according to the first aspect of the invention; at least two sensors for sensing vehicle operating conditions including a first vehicle operating condition and a second vehicle operating condition, said sensors providing to the display unit a first output signal and a second output signal indicative of, respectively the first vehicle operating condition and the second vehicle operating condition, the display unit being arranged to convert said first and second output signals into corresponding rotational movement of, respectively, a first pointer assembly and a second pointer assembly; wherein the first output signal is indicative of a fast-changing vehicle operating condition and the second output signal is indicative of a slow-changing vehicle operating condition.

The first and second operating conditions may be such that the first pointer assembly rotates, on average and during normal operation of the vehicle, at least a factor of ten times faster than the second pointer assembly.

Typically, the fast-changing operating condition will be the vehicle speed or the engine speed, and the slow-changing operating condition will be the fuel level or the engine temperature.

When the pointer display comprises a cap including display means, the display means may be arranged to receive said first or second output signal and indicate to an operator of the vehicle that a critical value of the first or second vehicle operating condition has been sensed by the sensors, for example as a low fuel warning. Alternatively, the motor vehicle may comprise a third sensor for sensing a third vehicle operating condition and the display means may be arranged to receive a third output signal from the third sensor and indicate to an operator of the vehicle the status of the third vehicle operating condition.

The third sensor may be used to determine the status of one vehicle condition from a turn signal indicator, headlights or fog lights, and the display means would then indicate, for example, whether the headlights of the vehicle are on or off.

BRIEF DESCRIPTION OF THE DRAWINGS

The invention will now be further described, by way of example only, and with reference to the accompanying drawings, in which:

FIGS. 6A and 6B show a front elevational view of one of the pointer displays of FIG. 4 having display means on the cap associated with a second vehicle condition;

FIG. 7 shows a front elevational view of the vehicle display unit of FIG. 4 in which the pointer displays both comprise display means corresponding with a third vehicle condition;

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
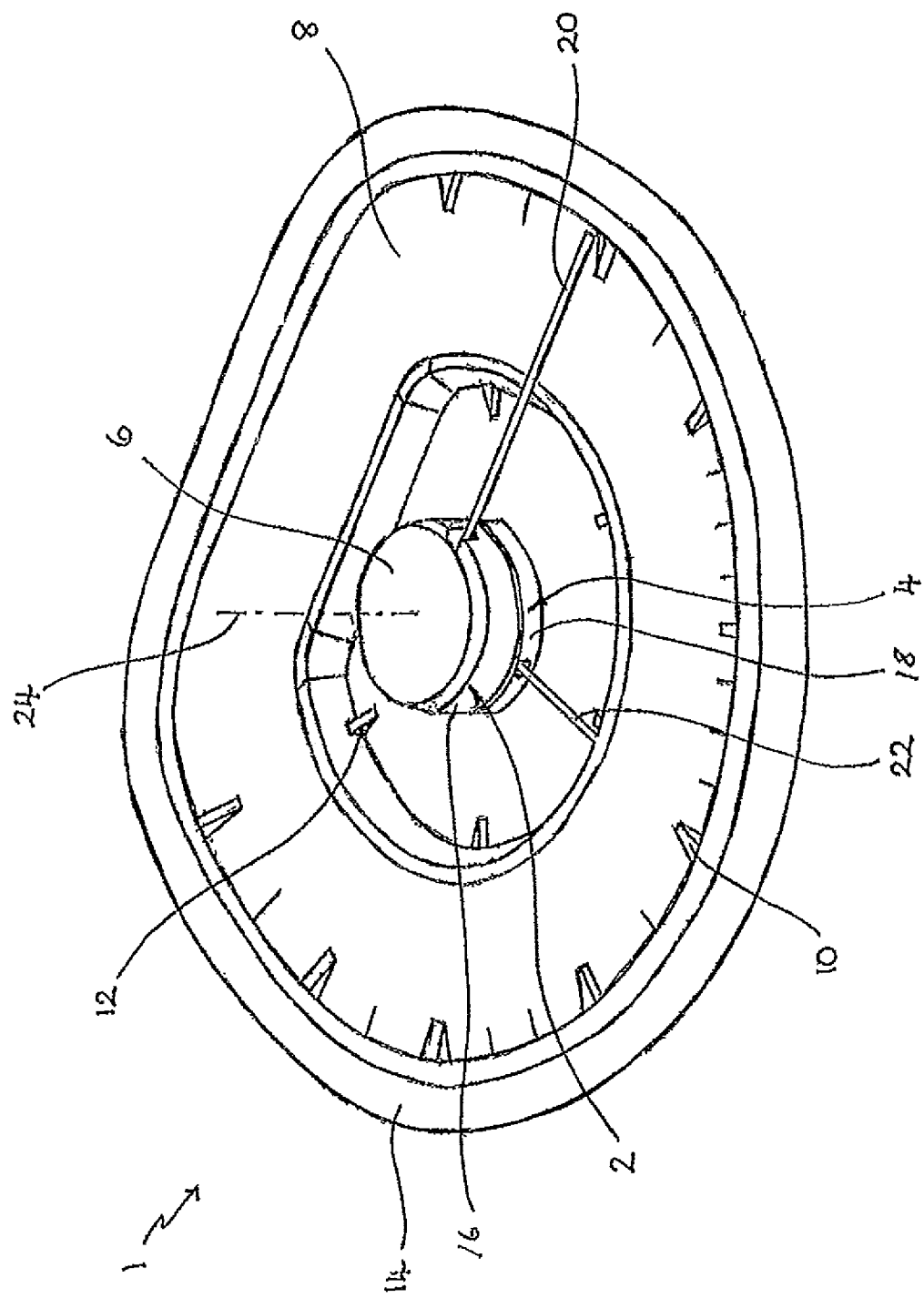
FIG. 1 is a perspective view of a pointer display according to an embodiment of the invention having two pointer assemblies.

FIG. 1 shows an embodiment of a pointer display 1 of the present invention. The pointer display 1 comprises two pointer assemblies 2, 4 covered by a cap 6. The pointer assemblies 2, 4 extend forwards of a dial face 8 having two concentric scales, specifically an outer scale 10 and an inner scale 12, the dial 8 also forming part of the display 1. The dial 8 is surrounded around its complete perimeter by a border or frame 14.

The pointer assemblies 2, 4 each respectively comprise a hub 16, 18 and a pointer arm 20, 22. In the embodiment shown, the hubs 16, 18 of both the first pointer assembly 2 and the second pointer assembly 4 are cylindrical, with the height of the cylinder being less than half the diameter. Alternatively, the height or thickness of the hubs 16, 18 may be substantially less than this, so that the hubs 16, 18 are in the form of discs. The diameters of the first 16 and second 18 hubs are substantially equal.

The pointer assemblies 2, 4 are in a stacked arrangement such that a first pointer assembly 2 is positioned on top of a second pointer assembly 4, and further from the front face of the dial 8.

Figure 2:
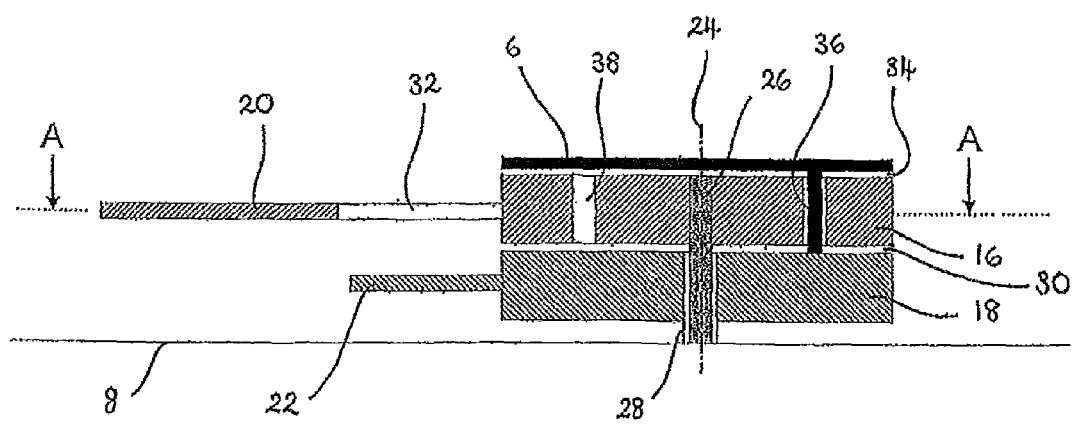
FIG. 2 is a schematic vertical cross-section through the pointer assemblies of FIG. 1.
Figure 3:
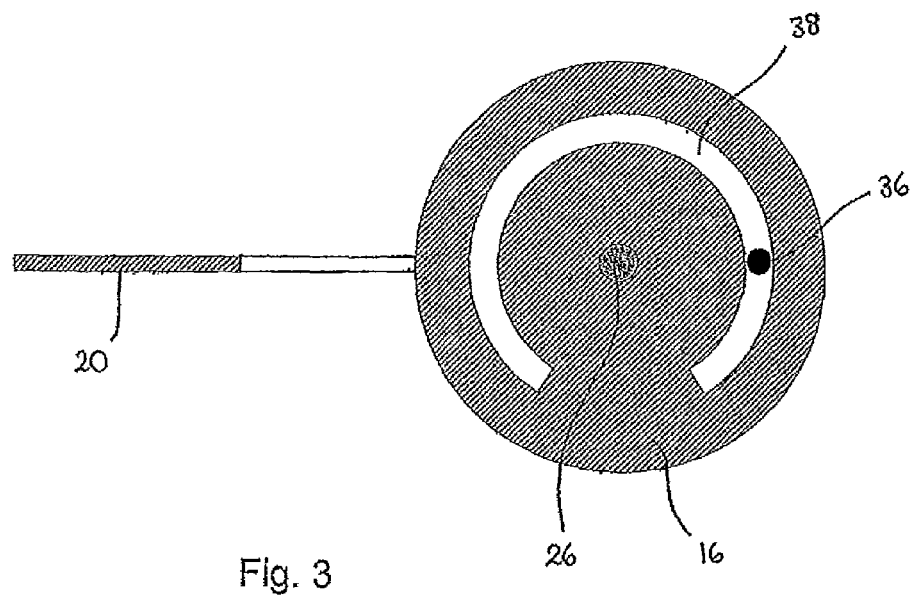
FIG. 3 is a schematic horizontal cross-section along the line A-A of FIG. 2.

With reference now also to FIGS. 2 and 3, the hubs 16, 18 of the pointer assemblies 2, 4 rotate about a common rotational axis 24 passing longitudinally through the center of the stacked hubs 16, 18 and extending substantially perpendicular to the plane of the dial 8. Typically the rotation of the hubs 16, 18 is driven by a stepper motor (not shown). In order to drive both hubs 16, 18 of the pointer display 1, the stepper motor is typically a dual shaft stepper motor having rotational outputs in the form of a central shaft 26 and an outer sleeve 28.

The outer sleeve 28 is connected centrally to the second hub 18 such that rotation of the sleeve 28 causes rotation of the second hub 18 about the rotation axis 24. The central shaft 26 extends from the stepper motor through the bore of the sleeve 28 and is rigidly connected to the center of the first hub 16. Rotation of the central shaft 26 by the stepper motor, therefore, causes a corresponding rotation of the first hub 16 about the common rotation axis 24.

The first 16 and second 18 hubs of the pointer assemblies 2, 4 are spaced apart from each other along the direction of the rotational axis 24 so that there is a small gap 30 between the hubs 16, 18. This gap 30 allows the hubs 16, 18 to rotate freely and independently of each other.

The pointer arm 20, 22 of each of the pointer assemblies 2, 4 extends radially outwards from the respective hub 16, 18. The pointer arms 20, 22 are rod shaped and may have any cross-sectional shape, for example circular, rectangular or triangular. The pointer arms 20, 22 may be tubular.

The pointer arms 20, 22 of the two pointer assemblies 2, 4 are of different lengths. In particular, the second pointer arm 22 is shorter than the first pointer arm 20, such that when the pointer assemblies 2, 4 are positioned with respect to the dial 8, the shorter second pointer arm 22 indicates a value on the inner scale 12 and the longer first pointer arm 20 indicates a value on the outer scale 10. The terms inner and outer refer to the placement of the scales with respect to the pointer assemblies 2, 4; the inner scale 12 being closer to the hubs 16, 18 of the pointer assemblies 2, 4 than the outer scale 10.

The stacked arrangement of the pointer assemblies 2, 4 is mounted centrally with respect to the dial 8 and the concentric scales 10, 12 so that the ends of the pointer arms 20, 22 are proximate the respective scales throughout the full rotation of the hubs 16, 18. In this configuration, and under certain conditions, the pointer arms 20, 22 of the two pointer assemblies 2, 4 will overlap. To allow a viewer to clearly see both pointer arms 20, 22 at all times, a portion 32 of the longer pointer arm, in this case the first pointer arm 20, may be made from a clear or transparent material 32, so that the second pointer arm 22 may still be seen when it is behind the first pointer arm 20, from the point of view of a viewer of the display 1.

A circular disc-shaped cap 6 is positioned adjacent to and co-axial with the first hub 16. The cap 6 is not in contact with the first hub 16 but it is spaced apart form the hub 16 along the direction of the rotational axis 24 so that there is a small gap 34 between the cap 6 and the first hub 16. The cap 6 is supported in this position by supporting means. The supporting means comprises a supporting member 36 in the form of a post or leg that is attached at one end to the underside of the cap 6; the underside of the cap being the face of the cap 6 directly opposing a face of the first hub 16.

The post 36 is attached in a position offset from the rotational axis 24 of the hubs 16, 18, and extends from the cap 6 in a direction parallel to the rotational axis 24. The post 36 or leg extends from the cap 6 through a passage or slot 38 in the first hub 16. The slot 38 is a hole that extends in one direction fully through the hub 16 and in a second direction circumferentially partly around the first hub 16, as shown in FIG. 3. The arcuate slot 38 is a major arc, that is, the length of the slot 38 subtends an angle of more than 180° around the rotational axis 24.

The post 36 passes through this slot 38 so that neither the cap 6 nor the post 36 is in contact with the first pointer assembly 2. In this way, rotational movement of the first hub 16 does not cause a corresponding rotational movement of the cap 6. The length of the arcuate slot 38 allows the first pointer assembly 2 to rotate freely through more than 180°, so that the first pointer assembly 2 may rotate over the full angular range of the scale 10 on the dial 8.

The distal end of the post 36, furthest from the cap 6, is rigidly connected to the second hub 18, which therefore also forms part of the supporting means in this embodiment of the invention. This causes the cap 6 to rotate in unison with the second pointer assembly 4.

It will be appreciated that the length of the slot 38 may be any suitable length and the length is chosen so that the two hubs 16, 18 are able to rotate fully through each of their corresponding angular ranges of scales 10, 12 on the dial 8, with the rotation of the first pointer assembly 2 remaining independent of the rotation of both the second pointer assembly 4 and the cap 6.

The cap 6 fully covers the hubs 16, 18 of both the first 2 and second 4 pointer assemblies. In particular, the cap 6 covers the hubs 16, 18 so that a viewer of the display 1 does not see the face of the first hub 16 adjacent the cap 6. In this embodiment, the diameter of the cap 6 is the same as the diameter of the first 16 and second 18 hubs. However, it may be advantageous to make the diameter of the cap 6 larger than the diameter of the hubs 16, 18 or to make the diameter of the first hub 16 smaller than the diameters of the cap 6 and second hub 18. In this way, the cap 6 obscures substantially all of the edges of the first hub 16 from a viewer of the display 1, at least when the viewer is viewing the display 1 at substantially 90° to the dial 8.

In another embodiment, the first pointer assembly 2 rotates in response to a fast-changing signal, and the second pointer assembly 4 rotates in response to a comparatively slow-changing signal. In this case, the term fast-changing means capable of changing quickly, and is used to denote values or signals that are, for example, likely to change significantly in a short period of time so that the movement is perceptible by eye. Slow-changing is used in the sense of being incapable, at least under normal conditions, of changing as rapidly as the fast-changing signal and may be so slow so as to be imperceptible by eye.

Because the cap 6 is not connected to the first pointer assembly 2, the first hub 16 is able to rotate in response to the fast-changing signals without causing a rotation of the cap 6. Therefore, to an observer of the display 1, the cap 6 appears to remain substantially stationary with respect to the rotational speed of the first pointer assembly 2. Although the cap 6 is connected by the post 36 to the second hub 18, the second pointer assembly 4 will, in general, only rotate through a few degrees during a typical period of observation of the dial, so that the rotation of the cap 6 is insignificant compared with the rotation of the first pointer assembly 2.

This allows a pattern or picture to be applied to the cap 6 of the pointer display 1 that will remain in an approximately constant orientation with respect to a viewer of the display 1. The cap 6 is separate and a significant distance from the border or frame 14 that surrounds the dial 8, and as the viewer is unable to see the means 36 used to support the cap 6, the viewer is presented with the illusion that the cap 6, that appears to be connected to the adjacent hub 16, is not rotating with the pointer assembly 2.

Figure 4:
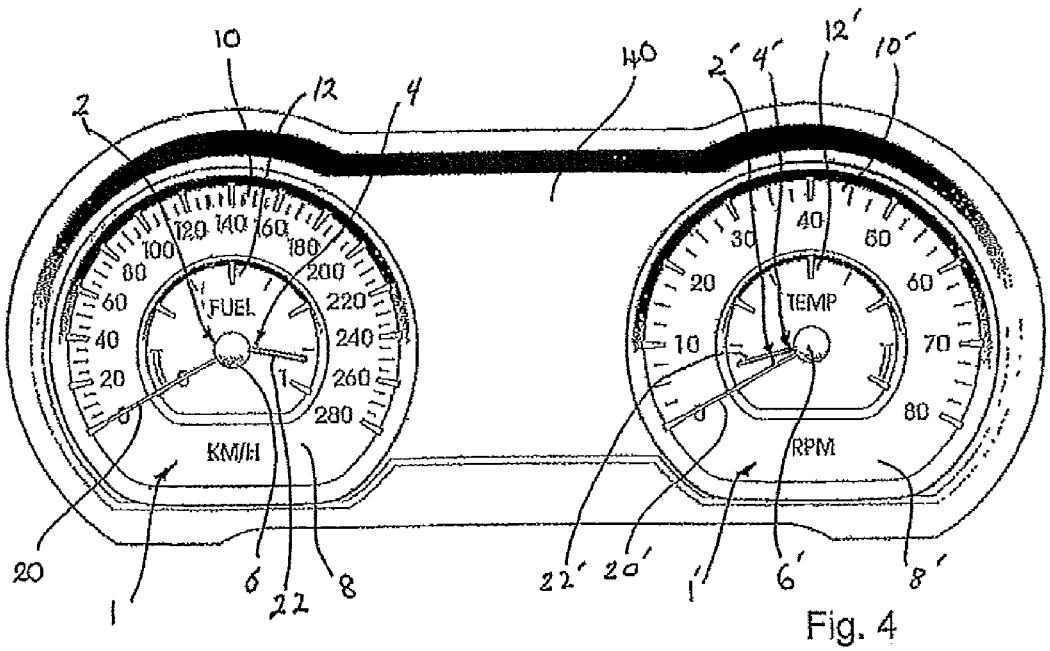
FIG. 4 shows a front elevational view of a vehicle display unit having two pointer displays similar to that of FIG. 1.

In one embodiment shown in FIG. 4, two pointer assemblies 2, 4, 2', 4' are used with two dials 8, 8' forming part of a vehicle display unit or dashboard 40. Each of the pointer displays 1, 1' thus formed is used to indicate to a driver of the vehicle at least two vehicle operating conditions. As shown in FIG. 4, the first pointer assembly 2, 2' having a longer arm 20, 20' indicates a value on an outer scale 10, 10' of the dial 8, 8'. This scale 10, 10' relates to a fast-changing vehicle condition such as engine or vehicle speed. The second pointer assembly 4, 4', having a shorter arm 22, 22', indicates a value on the inner scale 12, 12', which relates to a slow-changing vehicle condition such as fuel level or engine temperature.

Sensors in the vehicle monitor the vehicle conditions when the vehicle is running. Output signals from these sensors are then converted into rotational movement of the pointer assemblies 2, 4, 2', 4' such that the information is displayed to an operator of the vehicle. In this case, a first sensor measures or monitors a fast-changing condition such as engine speed and the output from this signal is converted to a rotational movement of the first pointer assembly 2, 2', Similarly, a second sensor measures a slow-changing condition such as fuel level and the output signal of this sensor is converted into a rotational movement or angular position of the second pointer assembly 4, 4'. During normal operation of the vehicle, the fast-changing condition such as engine speed is likely to change much faster and more frequently than the slow-changing condition such as fuel level.

In this case, the rotational speed of the first pointer assembly 2, 2' is, on average, faster than the rotational speed of the second pointer assembly 4, 4' and, as the cap 6, 6' is connected to the second hub 18 as shown in FIG. 2, it will appear to a viewer of the display 1, 1' that the cap 6, 6' is stationary with respect to the rotation of the first pointer assembly 2, 2'. This apparent illusion is further enhanced by the fact that it is the faster rotating of the two hubs 16, as shown in FIG. 2, that is closest to the cap 6, 6' and to a viewer of the display 1, 1'.

Figure 5:
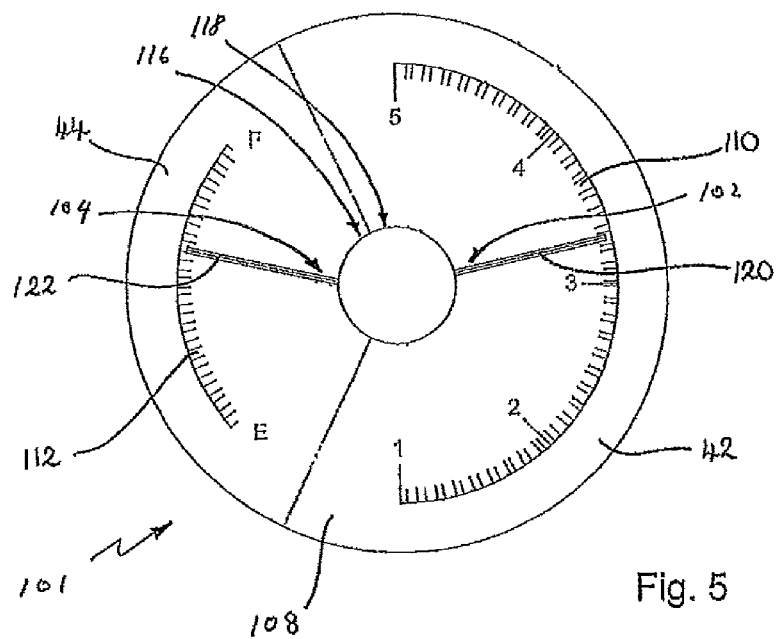
FIG. 5 is a front elevational view of a pointer display according to a another embodiment of the invention having two oppositely directed pointer assemblies.

So far, the pointer display 1 has been described as comprising a dial 8 having concentric scales 10, 12. The scales may, however, subtend different angles with respect to the hubs. FIG. 5 shows one example of this, in which features corresponding with those described above are indicated using reference numerals incremented by 100. In this embodiment, a pointer display 101 has a dial face 108 with two scales 110, 112 that are the same distance away from the hubs 116, 118 of corresponding pointer assemblies 102, 104, with a first scale 110 extending over a first sector 42 of the dial face 108 and a second scale 112, separated from the first scale 110, extending over a second sector 44 of the dial 108. The pointer arms 120, 122 then have the same or similar lengths, and the first pointer arm 120 indicates a value on the first scale 110 and the second pointer arm 122 indicates a value on the second scale 112. In this arrangement, the range of angles of rotation is limited for both pointer assemblies 102, 104 so that the pointer arms 120, 122 never overlie each other.

In further embodiments of the invention, shown in FIGS. 6 to 9, the cap 6 comprises additional display means 46. Generally this is in the form of a single light or a lit graphic display 46. The lit display 46 may be a warning light and in this case may be linked to one of the signals controlling the rotation of either the first 2 or second 4 pointer assembly.

FIGS. 6a and 6b show a modification of one of the pointer displays 1 shown in FIG. 4, in which the first pointer assembly 2 indicates the vehicle speed and the second pointer assembly 4 indicates the fuel level in the vehicle's fuel tank. A graphic display 46 in the cap 6 takes the form of a petrol pump symbol that is illuminated to indicate low fuel. Sensors in the motor vehicle that sense the level of the fuel, send output signals to a circuit (not shown), which then processes the signals and outputs the required rotation of the second pointer assembly 4 to a motor (not shown) driving the assembly. A light emitting diode (LED) or other suitable lamp that is used to illuminate the graphic display 46 is also connected to the circuit. When the signal reaches a predetermined threshold level, i.e. when the fuel has dropped to a particular level, the lamp is lit and the fuel warning symbol is illuminated, as shown in FIG. 6b. The graphic display 46 may be formed by an organic light emitting diode (OLED) display in the cap 6.

As the supporting member 36 (see FIG. 2) is connected to the second hub 18, the graphic display 46 rotates together with the second hub 18. Although the rotational speed of the second hub 18 is preferably slow compared to the rotational speed of the first pointer assembly 2, the total angular movement of the cap 6 over time may be significant.

In the case of the fuel warning light, the symbol is only illuminated over a limited angular range of the second pointer assembly 4 when the fuel level is low. Therefore, it may be possible for the graphic display 46 to be positioned on the cap 6 in a fixed orientation with respect to the cap 6 and in such a way that the graphic 46, when illuminated, is in the correct orientation to a viewer of the display 1. At higher fuel levels, and as shown in FIG. 6a, when the second pointer assembly 4 is in a different angular position, although the graphic symbol 46 will not be in the desired orientation for a viewer, the graphic 46 is not illuminated.

Figure 8:
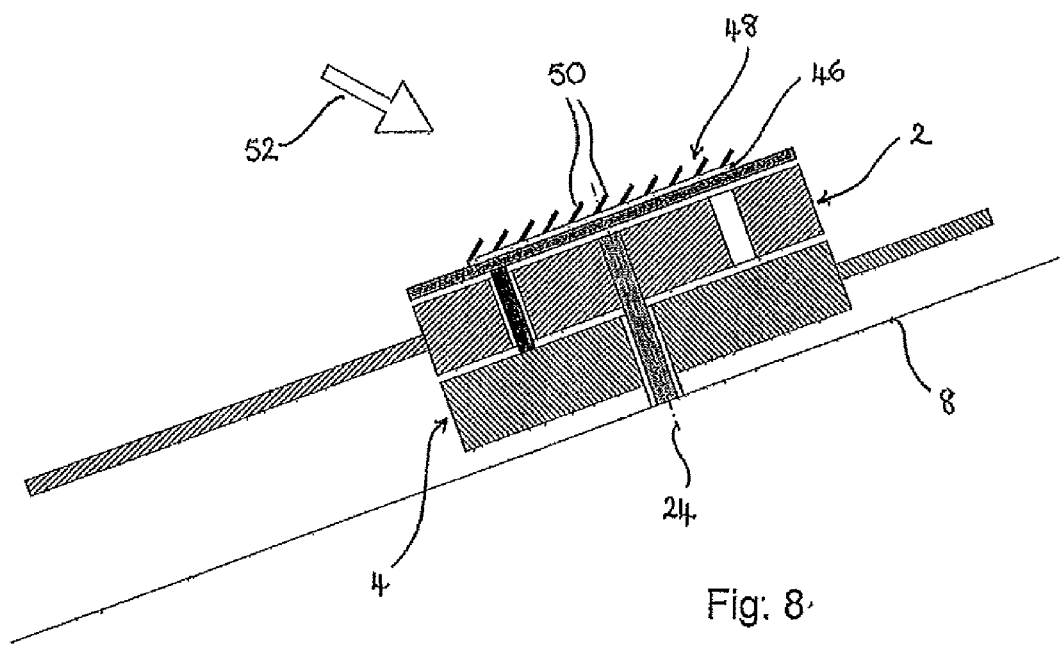
FIG. 8 is a schematic vertical cross-section through a pointer display having display means on the cap including micro louvers according to a further embodiment of the invention.
Figure 9:
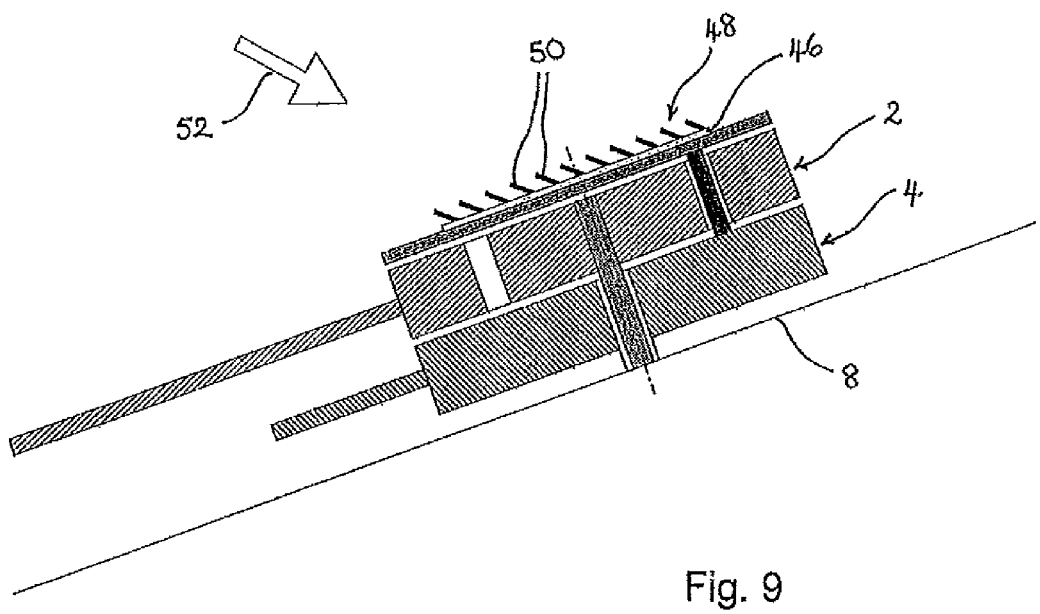
FIG. 9 is a schematic vertical cross-section of the pointer display of FIG. 8 with the second pointer assembly rotated through 180°.

In another embodiment, shown in FIGS. 8 and 9, the display means 46 includes micro louvers 48. Here the pointer display 1 is tilted at an angle to a viewer of the display 1. Typically the dial 8 will be inclined so that the top edge of the display 1 is further from the viewer than the bottom edge. The graphic display 46 is located on the upper face of the cap 6, facing a viewer of the display 1. The micro louvers 48 are then positioned over the graphic display 46, with micro louver slats 50 angled with respect to the plane of the cap 6. At certain orientations of the second pointer assembly 4, the cap 6 will be rotated such that a viewer is unable to see the graphic display 46 due to the angle of the slats 50. The viewer is then only able to see the graphic 46 when the second pointer assembly 4 has rotated to a given angle such that the viewing direction 52 is substantially parallel to the slats 50 of the micro louvers 48, as shown in FIG. 9.

The display means 46 may also be a holographic image. A hologram may be used to only display an image when the hologram is viewed from a particular direction, or the hologram may display two different images depending on the viewing angle. To facilitate the use of a holographic image on the cap 6 of the pointer display 1, the upper face of the cap 6 may be angled with respect to the plane of the pointer assembly hubs 16, 18. In this way, when the cap 6 is rotated within a first angular range, a first holographic image is seen, and when the cap 6 rotates to a within a second angular range a second holographic image is seen.

Alternatively, and especially if the graphic 46 is to be illuminated over a wide range of angles of rotation of the second pointer assembly 4, the display means 46 may be designed to include compensation means (not shown). The compensation means is used to rotate the displayed image to compensate for the orientation of the graphic 46 with respect to the orientation of the second hub 18, so that the graphic 46 remains in a fixed orientation with respect to a viewer of the pointer display 1. Automatic image compensation may be provided by a suitable circuit, with the degree of compensation being directly linked to the rotation or angular displacement of the second pointer assembly 4.

Figure 10:
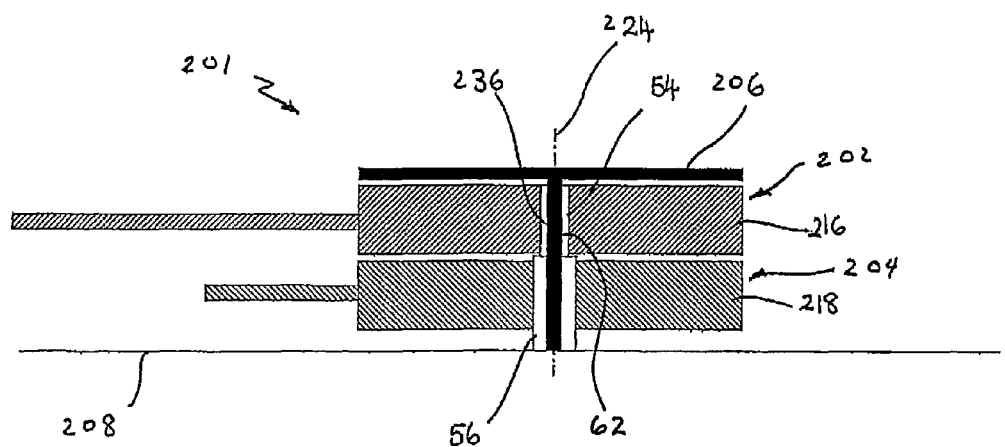
FIG. 10 is a schematic vertical cross-section through a pointer display according to another embodiment of the invention.
Figure 11:
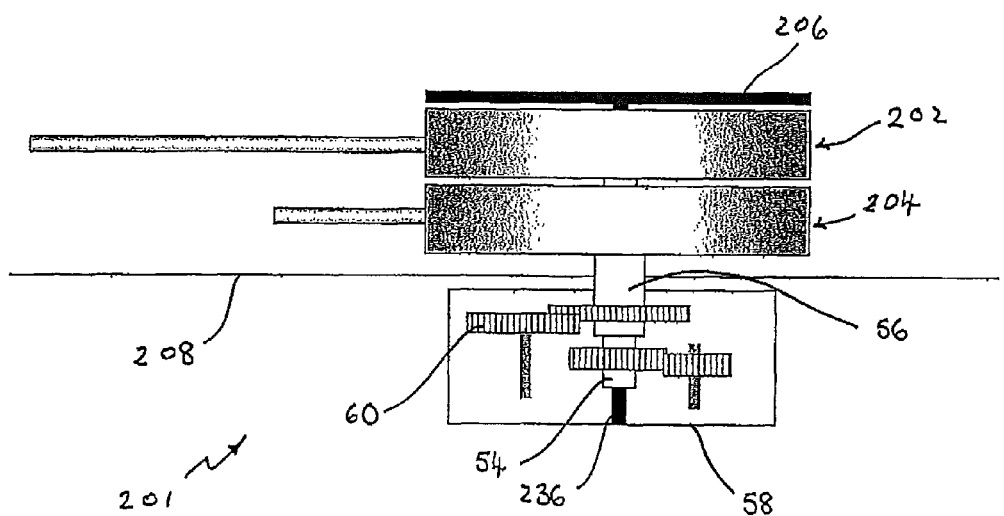
FIG. 11 is a schematic side view of the pointer display of FIG. 10 showing gears behind the dial and connected to the pointer assemblies.

FIGS. 10 and 11 show a further embodiment of the pointer display 201, in which features corresponding with the first embodiment are indicated with reference numerals incremented by 200. Here, the cap supporting member 236 passes through a passage 62 that is coaxial with the rotational axis 224 of the hubs 216, 218, as shown in FIG. 10. In this case, the pointer assemblies 202, 204 are driven by a stepper motor (not shown) having two coaxial tubular shafts, forming inner 54 and outer 56 sleeves. The inner sleeve 54 extends further than the outer sleeve 56 and is connected to the center of the first hub 216, and the outer sleeve 56 is connected to the center of the second hub 218. The supporting member includes an axial post 236 that extends from the cap 206 through the passage or an axial bore 62 of the inner sleeve 54 used to pivot the first hub 216, and the distal end of the supporting member 236 is connected to the dial 208 or to mounting means 58 behind the dial 208. The outer sleeve 56 extends around a distal portion of the inner sleeve and is used to pivot the second hub 218. The mounting means 58 may form part of the structure used to hold a stepper motor and gears 60 used to further control the speed of rotation of the sleeves 54, 56 and hubs 216, 218.

Mounting the cap 206 in this way means that the cap 206 remains stationary and both the first 202 and second 204 pointer assemblies can rotate independently and without causing a rotation of the cap 206.

Modifications may be made to the embodiments having an axial post 236 to include display means 246 in the cap 206. Because the cap 206 remains stationary with respect to both pointer assemblies 202, 204 and with respect to a viewer of the display 201, no image compensation means is required. Additionally, because the cap 206 is independent of both pointer assemblies 202, 204, the display means 246 may be used to indicate a third vehicle condition to the driver, unconnected to the vehicle conditions displayed on the two scales 110, 112 of the dial face 208.

For example, in one embodiment having non-rotating caps shown in FIG. 7, which shows two pointer displays 201, 201' forming part of a vehicle display unit or dashboard 240, graphic displays 246, 246' in the caps 206, 206' may be used to indicate the left or right activation of a turn signal indicator of a vehicle. Alternatively, the graphic displays 246, 246' may include an appropriate symbol and be backlit when an operator of the vehicle switches on the headlights or fog lights of the vehicle.

It will be appreciated that, although the hubs and cap have been described in these embodiments as having a circular cross-section, the hubs and cap may be of any suitable cross-sectional shape such that the hubs and cap can rotate freely and such that the cap covers at least the top face of the first hub from a viewer of the display.

It will further be appreciated that while the particular embodiments of the invention that have been described comprise two pointer assemblies, it is also possible for the pointer display to comprise more than two pointer assemblies.

The stacked arrangement of the hubs and cap of the pointer display, combined with a suitable dial, as has been described, has the advantage that several pieces of information may be displayed clearly to a viewer of the display in a limited space. This is particularly advantageous within the limited space of a vehicle dashboard in which a large amount of information must be presented to the operator of a vehicle and must be clearly visible at all times The additional ability to link the illumination of, for example, warning lights to the rotation of one of the pointer assemblies has the further advantage of improving the ease with which information can be extracted from the display in a short time. For example, if the operator of a vehicle sees a fuel warning light come on in the center of the dial, the information regarding how much fuel remains is displayed by one of the pointer assemblies on a scale in the same dial. This means that the viewer does not have to alter his or her line of sight to see this additional information.

Furthermore, by using supporting means that pass through a passage in a hub of the pointer assembly, the viewer is unable to see the means used to support the cap. The viewer is therefore presented with the illusion that the cap, that appears to be connected to the adjacent hub, is not rotating with the pointer assembly.

It should be noted that although the invention has been described in terms of a cover that fully covers the hubs of the first pointer assemblies, the invention is also applicable to a hub that partially covers the pointer assembly.

The present invention therefore provides an improved pointer display that provides a quality feel to a user of the display.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A pointer display comprising:
at least two pointer assemblies, each of the pointer assemblies having a hub with a pointer arm extending outwardly therefrom, the hubs rotatable about a common axis and positioned along an axial direction thereof, wherein a first one of the hubs is closer to a viewer of the pointer display;
a cap at least partially covering the first one of the hubs; and
a support member for supporting the cap, the support member extending through a passage formed in the first one of the hubs to support the cap independently of the first one of the hubs, wherein the passage is a slot extending in a circumferential direction through the first one of the hubs.

2. A pointer display according to claim 1, wherein a rotational speed of a first one of the pointer assemblies is greater than a rotational speed of a second one of the pointer assemblies.

3. A pointer display according to claim 2, wherein the first one of the pointer assemblies rotates, on average and during normal operation of the vehicle, at least a factor of ten times faster than the second one of the pointer assemblies.

4. A pointer display according to claim 2, wherein the first one of the pointer assemblies indicates a fast-changing operating condition to a viewer of the pointer display.

5. A pointer display according to claim 4, wherein the fast-changing operating condition is vehicle speed or engine speed.

6. A pointer display according to claim 2, wherein the second one of the pointer assemblies indicates a slow-changing operating condition to a viewer of the pointer display.

7. A pointer display according to claim 6, wherein the slow-changing operating condition is fuel level or engine temperature.

8. A pointer display according to claim 1, further comprising a dial, wherein the pointer assemblies are positioned adjacent a face of the dial.

9. A pointer display, according to claim 8, wherein the pointer arm of a first one of the pointer assemblies is longer relative to the pointer arm of a second one of the pointer assemblies, and wherein the dial includes two concentric scales indicating different measured values, wherein the pointer arm of the first one of the pointer assemblies indicates a value on an outer scale and the pointer arm of the second one of the pointer assemblies indicates a value on an inner scale.

10. A pointer display according to claim 1, wherein the support member is mounted to a second one of the hubs, and wherein the cap rotates in unison with the second one of the hubs.

11. A pointer display according to claim 10, wherein the cap includes display means.

12. A pointer display according to claim 11, wherein the display means includes a graphic.

13. A pointer display according to claim 12, wherein the display means includes compensation means for compensation of an orientation of the graphic with respect to an orientation of the second of the hubs to maintain the graphic in a fixed orientation with respect to the viewer of the pointer display.

14. A pointer display according to claim 12, wherein the graphic is visible to the viewer of the pointer display over a limited range of orientations of the second of the hubs.

15. A pointer display according to claim 14, wherein the display means includes micro louvers disposed thereon.

16. A pointer display according to claim 11, wherein the display means is an OLED display.

17. A pointer display according to claim 11, wherein the display means is a holographic display.

18. A pointer display according to claim 10, wherein the second one of the hubs is directly adjacent the first one of the hubs.

19. A pointer display comprising:
a first pointer assembly having a first hub with a pointer arm extending outwardly therefrom;
a second pointer assembly having a second hub with a pointer arm extending outwardly therefrom, the first hub and the second hub rotatable about a common axis and positioned adjacent one another along the common axis;
a cap at least partially covering the first hub; and
a support member for supporting the cap, the support member extending through a passage formed in the first hub to support the cap independently of the first hub, wherein the passage is a slot extending in a circumferential direction through the first hub.

20. A pointer display comprising:
a dial including a first scale concentric with a second scale, the first scale and the second scale indicating different measured values;

a first pointer assembly having a first hub with a pointer arm extending outwardly therefrom;

a second pointer assembly having a second hub with a pointer arm extending outwardly therefrom, wherein the first hub and the second hub rotate about a common axis, and wherein the second hub is interposed between the first hub and the dial;

a cap at least partially covering the first hub; and a support member for supporting the cap, the support member extending through a passage formed in the first hub to support the cap independently of the first hub, wherein the passage is a slot extending in a circumferential direction through the first hub.

* * * * *